United States Patent [19]

Ishii et al.

[11] Patent Number: 4,535,837
[45] Date of Patent: Aug. 20, 1985

[54] LATENT HEAT STORAGE DEVICE

[75] Inventors: Takahito Ishii, Yamatokoriyama; Kazuo Yamashita, Ikoma; Hiroshi Uno, Nara, all of Japan

[73] Assignee: Matsushita Electric Industrial Co., Ltd., Kadoma, Japan

[21] Appl. No.: 584,393

[22] Filed: Feb. 28, 1984

[30] Foreign Application Priority Data

Mar. 2, 1983 [JP] Japan .................................. 58-34967
Mar. 29, 1983 [JP] Japan .................................. 58-54431
Mar. 29, 1983 [JP] Japan .................................. 58-54432

[51] Int. Cl.³ .............................................. F28D 21/00
[52] U.S. Cl. ................... 165/104.17; 165/111; 165/104.11; 126/436
[58] Field of Search ...................... 165/104.17, 104.11, 165/111, 10; 126/433, 436, 435

[56] References Cited

U.S. PATENT DOCUMENTS 4,286,650 9/1981 Lindner .............................. 165/111
4,466,478 8/1984 Carlsson et al. ..................... 165/111

FOREIGN PATENT DOCUMENTS 92889 7/1980 Japan ............................. 165/104.17

*Primary Examiner*—Albert W. Davis, Jr.
*Attorney, Agent, or Firm*—Spencer & Frank

[57] ABSTRACT

Upon heat being liberated, a latent heat storage material is kept in indirect contact with a heat transfer medium through a heat liberation or output accelerating material. Thus, the heat of fusion of the storage material is taken out with high efficiency. Since a heat input accelerating material is taken into a solid phase of the storage material, the heat input velocity at which heat is transferred to the storage material is greatly increased when heat is transferred or stored thereinto. Thus, a practical latent heat storage device having excellent heat input and output characteristic has been materialized.

22 Claims, 4 Drawing Figures

LATENT HEAT STORAGE DEVICE

BACKGROUND OF THE INVENTION

The present invention relates to a latent heat storage device for storing heat energy of, for example, solar heat, waste heat, etc. by the use of a latent heat storage material and which permits the use of such heat energy in supplying hot water, cooling and heating, etc.

DESCRIPTION OF THE PRIOR ART

A prior art latent heat storage device of this type is arranged such that, as shown in FIG. 1, a latent heat storage material 2 (hereinafter, referred to simply as "heat storage material") and a heat transfer medium 3 almost immiscible with the heat storage material 2 and, at the same time, having a density equal to or higher than the density of the liquid phase 2b of the heat storage material 2 are sealed into a closed vessel 1 with a space portion A being left in the uppermost part of the vessel interior. In this arrangement, an output heat exchanger 4 is provided at the space portion and an input heat exchanger 5 in the heat storage material 2.

With the above-mentioned construction, the heat of fusion possessed by the liquid phase 2b of the heat storage material 2 is taken out as follows. The vapor 3a of the heat transfer medium 3 having reached the space portion A by receiving the heat of fusion of the liquid phase 2b of the heat storage material 2 releases or liberates its heat of evaporation on the output heat exchanger 4, thus becoming a conensed liquid 3b.

The condensed liquid 3b is allowed to drop back into the heat storage material 2 and thus is directly contacted with the liquid phase 2b of the heat storage material 2, thereby receiving the heat of fusion. On the other hand, after having liberated its heat of fusion, the liquid phase 2b changes into a solid phase 2a. However, the velocity at which the heat is transferred from the liquid phase 2b to the condensed liquid 3b is very high because such heat transfer is effected due to the direct contact therebetween. For this reason, although the density of the condensed liquid 3b is higher than that of the liquid phase 2, the condensed liquid 3b is not sedimented, through the liquid phase 2b of the heat storage material 2, down to a sufficiently lower point, since the condensed liquid 3b receives, as soon as it drops into the heat storage material 2, the heat of fusion from the liquid phase 2b of the heat storage material residing in the upper part of the solid/liquid phase zone B, thus becoming the vapor 3a. Thus, the temperature of the heat storage material 2 in the upper part of the solid/liquid phase zone B, i.e., in the vicinity of the bundary surface C decreases with the result that the solid phase 2a of the heat storage material 2 is precipitated there. Since this solid phase 2a is higher in density than the liquid phase 2b, it begins to sediment downwards. On the other hand, the heat transfer medium 3 is still repeating its evaporation and condensation during this time period as well. As a result, the temperature of the heat storage material 2 in the vicinity of the boundary surface C is further decreased. In this way, the heat exchange mass of the output heat exchanger 4 is rapidly decreased. The greater the initial heat exchange mass of the output heat exchanger 4, the more prominent this tendency is. Where the initial heat exchange mass is too great, it becomes possible that the boundary surface C is blocked, as a whole, by the solid phase 2a with the liquid phase 2b of the heat storage material 2 residing in the lower part of the solid/liquid phase zone B. In such a condition, it is impossible to take out the heat of fusion from the remaining liquid phase 2b.

In FIG. 4, the relationship between the amount of output hot water and the temperature of output water, obtained by a hot-water feeding heat storage device with the use of sodium acetate trihydrate (m.p. 58° C., having a density of 1.44 g/cm$^3$ in its solid stage and a density of 1.28 g/cm$^3$ in its liquid state) as the heat storage material 2 and a material of trichlorotrifluoroethane, sold under the trademark FREON-113 (b.p. 47.6° C., having a density of 1.57 g/cm$^3$ at a temperature of 25° C.) as the heat transfer medium 3 is shown by a broken line. In this test, the amount of taken-out hot water is 10 l/min. and the temperature of water at the entrance is 5° C. As understood, it is impossible to effectively utilize the heat energy stored in the heat storage material in the form of a heat of fusion. Besides, the prior art latent heat storage device also failed to deliver its heat output with a high power at a constant temperature.

Meanwhile, heat storage is effected by supplying heat energy from the heat exchanger 5 provided in the closed vessel 1. When heat is absorbed, the heat storage material 2 changes its state from the solid phase 2a to the liquid phase 2b. However, since the heat conductivity of the solid phase 2a of the heat storage material 2 generally is low, a speedy heat storage is impossible. Particularly, as stated before, the solid phase 2b formed at the boundary surface C upon completion of the heat outputting is stiff or rigid. A large amount of time was required for dissolving the solid phase 2a.

Further, as mentioned above, the heat transfer used in the prior art latent heat storage device is limited to a type having a density equal to or higher than that of the liquid phase 2b of the heat storage material. Namely, the heat transfer medium having a density lower than that of the liquid phase 2b of the heat storage material 2 can not be used at all. When it is taken into consideration that the density of the latent heat storage material 2 in general is high, this indicates that the heat transfer medium 3 usable in the prior art latent heat storage device is very much limited. Namely, the prior art device has less flexibility to heat transfer mediums.

SUMMARY OF THE INVENTION

The present invention has been devised to solve the above-mentioned conventional drawbacks.

Therefore, one object of the present invention is to provide a practical latent heat storage device which has excellent heat input and output efficiency so as to permit the effective utilization of the heat of fusion possessed in a latent heat storage material.

To attain the above object, according to the present invention, a latent heat storage material, a heat transfer medium almost immiscible with the heat storage material and changing from a liquid state to a gaseous state when it absorbs heat and from a gaseous state to a liquid state when it releases heat, and a heat output accelerating material having a density higher than at least the density of the liquid phase of the heat storage material and being selectively more wettable with the heat transfer medium than with the heat storage material are sealed in a closed vessel with a space portion being left in the upper part thereof. Further, a heat input accelerating material having a heat conductivity higher than at least the conductivity of the solid phase of the heat storage material and being selectively more wettable with the heat storage material than with the heat transfer medium is additionally sealed into the closed vessel. With this construction, the heat output accelerating material is selectively wetted with the heat transfer medium and is taken into and onto it, while the heat input accelerating material is selectively wetted with the heat storage material and is dispersed therein.

DETAILED DESCRIPTION OF THE PREFERRED EMBODIMENT

Figure 1:
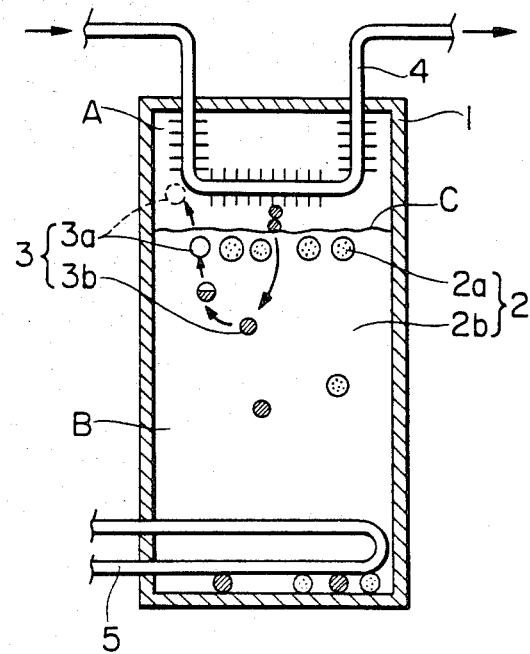
FIG. 1 is a sectional view of a prior art latent heat storage device.
Figure 2:
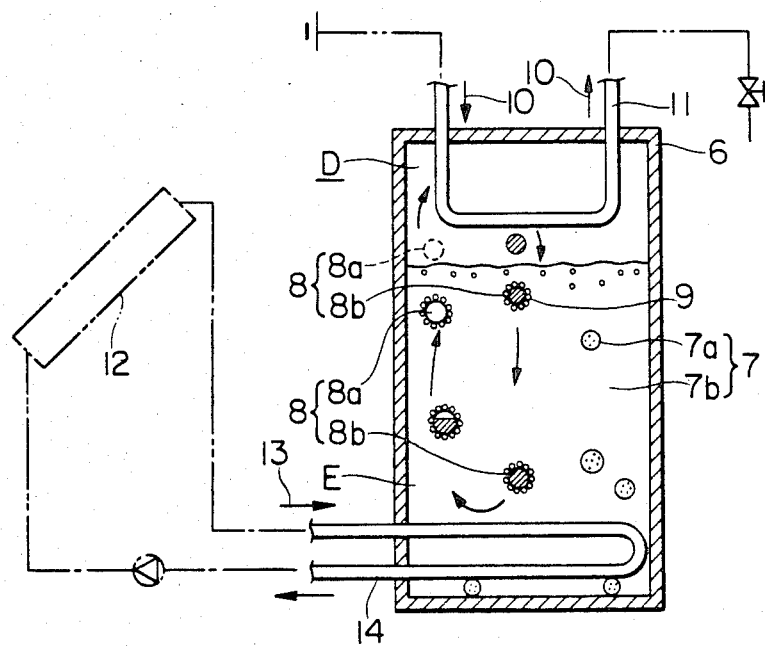
FIG. 2 is a sectional view of the latent heat storage device according to an embodiment of the present invention.

An embodiment of the present invention will now be described with reference to FIG. 2. In FIG. 2, three types of materials, i.e., a latent heat storage material 7 such as, for example, sodium acetate trihydrate (having a fusion point of 58° C., a density of 1.44 g/cm$^3$ in a solid state and a density of 1.28 g/cm$^3$ in a liquid state), a heat transfer medium 8 such as, for example, trichlorotrifluoroethane (having a boiling point of 47.6° C. and a density of 1.57 g/cm$^3$ under a temperature of 25° C.), which is almost immiscible with the latent heat storage material 7 and which changes from a liquid state to a solid state at the time of absorbing heat and changes from a solid state to a liquid state at the time of liberating heat, and a heat output accelerating material 9 such as, for example, carbon powder (d. 2.2 g/cm$^3$, 100 mesh), which has a density higher than that of a liquid phase 7b of the latent heat storage material 7 and also has a higher wettability or affinity with the heat transfer medium 8 than with the latent heat storage material 7, are sealed in a closed vessel 6 with a space portion remaining therein. It is noted that an uncondensible gas such as, for example, air is removed therefrom. In the space portion D there is provided a heat dissipation instrument 11 through which a heat dissipation or exothermic medium 10 such as, for example, a hot feed water passes. On the other hand, in a portion E wherein the latent heat storage material 7 is filled, a heater 14 is provided, through which is allowed to pass a heating medium 13 having its temperature increased by receiving a solar heat within a heat collector 12.

Figure 4:
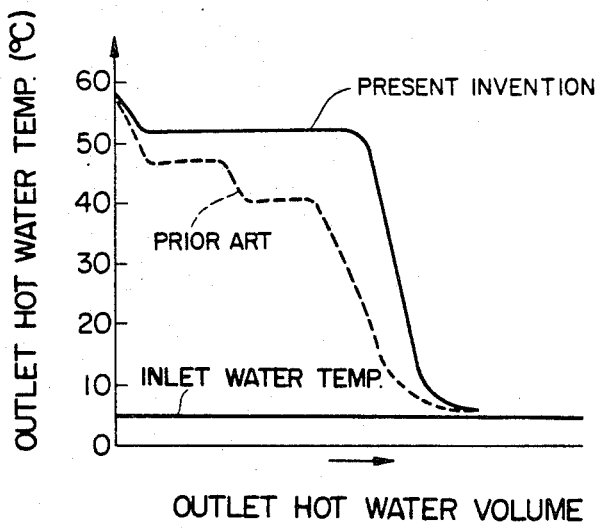

With the above-mentioned construction, the interior of the closed vessel 6, just after the completion of heat storage, is filled with the liquid phase 7b produced by fusion of the solid phase 7a of the latent heat storage material 7 and a saturated vapor consisting of a vapor 8a of the heat transfer medium 8 and a liquid (condensed liquid) 8b. Heat dissipation is effected by passing a low temperature exothermic medium 10 through the heat dissipation instrument 11. At this time, the vapor 8a of the heat transfer medium 8 prevailing in the space portion D is cooled and releases its heat of evaporation at the outer wall surface of a pipe constituting the heat dissipation instrument or device 11, thus becoming a condensed liquid 8b. The low temperature medium 10 has its temperature increased by being heated by such heat of evaporation. When the condensed liquid 8b is allowed to drop into the liquid phase 7b of the latent heat storage material 7, the heat output accelerating material 9 is soon taken onto and into the condensed liquid 8b. This is because the heat output accelerating material 9 is more highly wettable with respect to the condensed liquid 8b of the heat transfer medium 8 than with respect to the liquid phase 7b of the latent heat storage material 7. Since the density of the heat output accelerating material 9 is high, the apparent density of the condensed liquid of the heat transfer medium 8 is increased. Further, the condensed liquid 8b is brought into indirect contact with the liquid phase 7b of the latent heat storage material 7 through the heat output accelerating material 9. It should be noted here that, while, in the evaporation and condensation process of the heat transfer medium 8, the condensed liquid 8b becomes the vapor 8a by being transmitted thereinto with a latent heat of fusion liberated from the liquid phase 7b of the latent heat storage material 7, at the time of this transmission the condensed liquid 8b indirectly receives necessary heat (latent heat of evaporation) almost as a whole through a layer of heat output accelerating material 9 formed thereon and does not receive it directly from said liquid phase 7b. As a result, the transfer of the latent heat of fusion from the liquid phase 7b to the condensed liquid 8b is delayed as compared with the case where such transfer is directly effected. As a result, the condensed liquid 8b can be sedimented down to a sufficiently lower position in the solid/liquid phase zone E of the latent heat storage material 7. Thus, the condensed liquid 8b receives the latent heat of fusion uniformly from the whole of the liquid phase 7b of the latent heat storage material 7 and thus gradually becomes the vapor 8a to go up again into the space portion D. On the other hand, the liquid phase 7b having released its latent heat of fusion becomes the solid phase 7a and thus sequentially sediments downwards. In this way, it is possible, with high efficiency, to take out the latent heat of fusion stored in the state of liquid phase 7b. In FIG. 4, the relationship between the amount of output hot water and the temperature of output hot water, as obtained according to this embodiment, is shown by a solid line (the feeding amount of hot water: 10 l/min.; the temperature of water at the inlet: 5° C.; the latent heat storage material: CH$_3$COONa.3-H$_2$O; the heat transfer medium: trichlorotrifluoroethane; and the heat output accelerating material: carbon powder). Note here that, in order to form a layer of heat output accelerating material 9 on the condensed liquid 8b reliably, it is necessary previously to add a sufficient amount of heat output accelerating material 9 into the closed vessel 6.

The process of heat storage will now be described. Upon completion of the heat liberation, the liquid phase 7b, as a whole, of the latent heat storage material 7 has become the solid phase 7a. On the other hand, since the heat output accelerating material 9 presents a low wettability or affinity with respect to the liquid phase 7b of the latent heat storage material 7, the material 9 is little taken into the solid phase 7a of the latent heat storage material 7. Namely although a bit of the heat output accelerating material 9 is likely to be dispersed into the liquid phase 7b due to a stirring effect produced at the time of evaporation and condensation of the heat transfer medium 8 and can thus be taken into the liquid phase 7b when the same is crystallized, the major part thereof, however, is not taken into storage material 7. Accordingly, upon completion of the heat liberation, the vessel 6 is filled with the solid phase 7a of substantially homogeneous and continuous masses of the latent heat storage material 7. However, the condensed liquid 8b of the heat transfer medium 8 and the heat output accelerating material 9 exist on or around the solid phase 7a. Since, therefore, the heat conductivity of the bulk-shaped solid phase 7a shows almost no variation (i.e., still remains low), the heat storage (heat input) velocity at which heat is transferred from the heater 14 to the solid phase 7a was not satisfactory, although the heat conductivity of the solid phase 7a is improved to some extent due to the presence of the heat output accelerating material 9.

Figure 3:
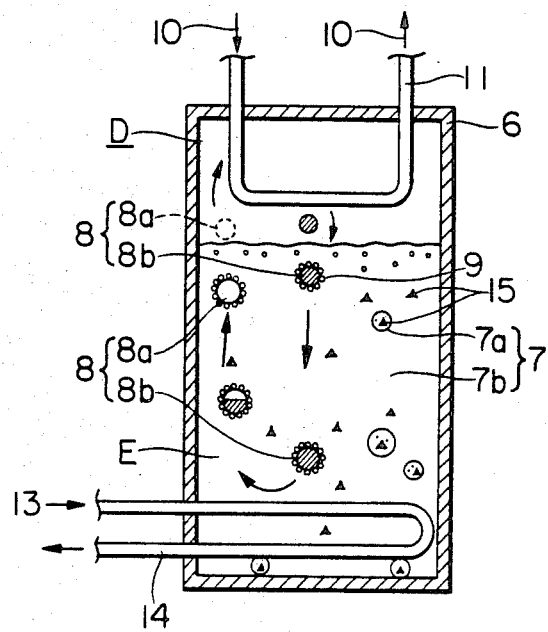
FIG. 3 is a sectional view of the latent heat storage device according to another embodiment of the present invention; and, FIG. 4 graphically shows the relationship between the amount of output hot water and the temperature of output hot water in comparison between the latent heat storage device of prior art and the latent heat storage device of the present invention.

There will now be described a latent heat storage device according to another embodiment of the present invention with reference to FIG. 3. The embodiment shown in FIG. 3 differs from the preceding embodiment in that the contents of the closed vessel 6 are added, in addition to the materials used in the first embodiment, with a heat storage accelerating material 15—for example, alumina powder (d: 3.98 g/cm$^3$, 100 mesh)—having a heat conductivity at least higher than the heat conductivity of the solid phase 7a of the latent heat storage material 7 and having a higher degree of wettability with the latent heat storage material 7 than does the heat transfer medium 8. The heat storage accelerating material 15, as mentioned above, is selectively wetted with respect to the liquid phase 7b of the latent heat storage material 7. As a result, the heat storage accelerating material 15 is taken into the solid phase 7a formed at the time of liberation of heat of the latent heat storage material 7. Thus, the apparent heat conductivity of the solid phase 7a increases due to the existence of the heat storage accelerating material 15 having a high heat conductivity. Thus, the heat energy from the heater 14 at the time of storage of heat into the latent heat storage material 7 is transmitted into the solid phase 7a thereof, quickly. The heat output characteristic of the material 7 is excellent as in the preceding embodiment. Since the heat storage accelerating material 15 does not affect the liquid phase 7b of the latent heat storage material 7, no undesirable effect comes about upon the heat output characteristic thereof.

As stated above, the present invention has been devised with conception placed upon the wettability or affinity of the heat storage accelerating material 15 and heat output accelerating material 9 with respect to the liquid phase 7b of the latent heat storage material 7 and the condensed liquid 8b of the heat transfer medium 8, respectively. Generally speaking in the case of two liquids both being either polar or non-polar, both liquids (liquid phase 7b and condensed liquid 8b) have miscibility (solubility) with respect to each other. Therefore, that, as in the present invention, both are immiscible with each other means that both are greatly different in polarity and therefore have no affinity with each other. A polar liquid is hydrophilic and a non-polar liquid is lipophilic. On the other hand, the property of being polar or non-polar can be similarly applicable to solids (heat transfer accelerating material 9, 10). Namely, a polar solid is easy to wet with a polar liquid, while, on the other hand, a non-polar solid is easy to wet with a non-polar liquid. When the solid is wetted with liquid, it is easily dispersed into the liquid. When the solid is not wetted, it is rejected by the liquid. Where a powder is large in mesh, it can float on the liquid even if its density is higher than that of the liquid. Accordingly, the carbon powder (non-polar solid) used in this embodiment is wetted with the condensed liquid of trichlorotrifluorethane (non-polar liquid, lipophilic) and thus is easily drawn onto and into that liquid. The alumina powder (polar solid) is wetted with the liquid phase of $CH_3COONa.3H_2O$ (polar liquid, hydrophilic) and thus is well dispersed thereinto. Alumina powder can be used in place of carbon powder. In this case, the alumina powder has only to be treated with, for example, a silicon type repellent (methyl hydrodien cyloxane). Further, in the preceding embodiments, a hydrate type heat storage material was used as the latent heat storage material 7 but, needless to say, the present invention is not limited thereto.

Further, in the preceding embodiments, reference was made to the case where the density of the heat transfer medium is higher than the density of the liquid phase of the latent heat storage material. However, the invention is also applicable in the case, as well, where the density of the heat transfer medium is lower than the density of the liquid phase of the latent heat storage material. For example, trichlorotrifluorethane (b.p: 47.6° C., density: 1.57 g/cm$^3$ under a temperature of 25° C.) can be used as a heat transfer medium and sodium thiosulfate (m.p. 48.5° C., the density: 1.72 g/cm$^3$ in a solid state) can be used as a latent heat storage material. This is because the heat output accelerating material is drawn onto, as well as into, the heat transfer medium in the latent heat storage material, whereby the apparent density of the heat transfer medium can be made high. Further, in FIG. 2, reference was made to the case where solar heat is used as a heat source for transferring heat to hot feed water. The invention, however, is not limited thereto. For example, off peak power, heat pump, etc. can used as a heat source for the heat to be used for heating.

What is claimed is:

1. A latent heat storage device comprising a closed vessel sealingly containing therein a latent heat storage material, a heat transfer medium substantially immiscibile with said latent heat storage material and changing from a liquid state to a gaseous state at the time of absorption of heat and from a gaseous state to a liquid state at the time of liberation of heat, and a heat output accelerating material having a density higher than at least the density of liquid phase of said latent heat storage material and being selectively wettable with said heat transfer medium more than with said latent heat storage material, and a space portion being left in the uppermost area of the interior of the closed vessel.

2. A latent heat storage device according to claim 1, wherein a hydrate type heat storage material is used as the latent heat storage material.

3. A latent heat storage device according to claim 1, wherein a heat input accelerating material having a heat conductivity higher than at least the heat conductivity of solid phase of said latent heat storage material and being more wettable selectively with said latent heat storage material than said heat transfer medium is mixed into said latent heat storage material.

4. A latent heat storage device according to claim 3, wherein alumina powder is used as said heat input accelerating material.

5. A latent heat storage device comprising a closed vessel sealingly containing a latent heat storage material, a heat transfer medium substantially imiscibile with said latent heat storage material and changing from a liquid state to a gaseous state at the time of absorption of heat and from a gaseous state to a liquid state at the time of liberation of heat, a fluorinated hydrocarbon material being used as said heat transfer medium and a heat output accelerating material having a density higher than at least the density of liquid phase of said latent heat storage material and being wettable selectably with said heat transfer medium more than with said latent heat storage material, and a space portion being left in the uppermost area of the interior of the closed vessel.

6. A latent heat storage device according to claim 5, wherein a hydrate type heat storage material is used as said latent heat storage material.

7. A latent heat storage device according to claim 5, wherein trichlorotrifluoroethane is used as said fluorinated hydrocarbon material.

8. A latent heat storage device according to claim 5, wherein a heat input accelerating material having a heat conductivity higher than at least the heat conductivity of solid phase of said latent heat storage material and being more wettable selectively with said latent heat storage material than with said heat transfer medium is mixed into said latent heat storage material.

9. A latent heat storage device according to claim 8, wherein alumina powder is used as said heat input accelerating material.

10. A latent heat storage device comprising a closed vessel containing therein a latent heat storage material, a heat transfer medium substantially immiscibile with said latent heat storage material and changing from a liquid state to a gaseous state at the time of absorption of heat and, from a gaseous state to a liquid state at the time of liberation of heat, a fluorinated hydrocarbon material being used as said heat transfer medium and a heat output accelerating material having a density higher than at least the density of liquid phase of said latent heat storage material and being wettable selectively with said heat transfer medium more than with said latent heat storage material, carbon powder is used as said heat output accelerating material, and a space portion being left in the uppermost area of the interior, of the closed vessel.

11. A latent heat storage device according to claim 10, wherein a hydrate type heat storage material is used as said latent heat storage material.

12. A latent heat storage device according to claim 10, wherein trichlorotrifluoroethane is used as said fluorinated hydrocarbon material.

13. A latent heat storage device according to claim 10, wherein a heat input accelerating material having a heat conductivity higher than at least the heat conductivity of solid phase of said latent heat storage material and being selectively wettable with said latent heat storage material to a higher degree than with said heat transfer medium is mixed into said latent heat storage material.

14. A latent heat storage device according to claim 13, wherein alumina powder is used as said heat input accelerating material.

15. A latent heat storage device according to claim 2, wherein a heat input accelerating material having a heat conductivity higher than at least the heat conductivity of solid phase of said latent heat storage material and being more wettable selectively with said latent heat storage material than said heat transfer medium is mixed into said latent heat storage material.

16. A latent heat storage device according to claim 15, wherein alumina powder is used as said heat input accelerating material.

17. A latent heat storage device according to claim 6, wherein trichlorotrifluorethane is used as said fluorinated hydrocarbon material.

18. A latent heat storage device according to claim 6, wherein a heat input accelerating material having a heat conductivity higher than at least the heat conductivity of solid phase of said latent heat storage material and being more wettable selectively with said latent heat storage material than with said heat transfer medium is mixed into said latent heat storage material.

19. A latent heat storage device according to claim 7, wherein a heat input accelerating material having a heat conductivity higher than at least the heat conductivity of solid phase of said latent heat storage material and being more wettable selectively with said latent heat storage material than with said heat transfer medium is mixed into said latent heat storage material.

20. A latent heat storage device according to claim 11, wherein a trichlorotrifluoroethane is used as said fluorinated hydrocarbon material.

21. A latent heat storage device according to claim 11, wherein a heat input accelerating material having a heat conductivity higher than at least the heat conductivity of solid phase of said latent heat storage material and being selectively wettable with said latent heat storage material to a higher degree than with said heat transfer medium is mixed into said latent heat storage material.

22. A latent heat storage device according to claim 12, wherein a heat input accelerating material having a heat conductivity higher than at least the heat conductivity of solid phase of said latent heat storage material and being selectively wettable with said latent heat storage material to a higher degree than with said heat transfer medium is mixed into said latent heat storage material.

* * * * *